United States Patent [19]

Nikolin, Jr.

[11] Patent Number: 5,787,429
[45] Date of Patent: Jul. 28, 1998

[54] POTENTIAL HAZARD AND RISK-ASSESSMENT DATA COMMUNICATION NETWORK

[76] Inventor: Michael A. Nikolin, Jr., 717 Highland Ave., San Mateo, Calif. 94401

[21] Appl. No.: 675,699

[22] Filed: Jul. 3, 1996

[51] Int. Cl.$^6$ .................................................. G06F 17/30
[52] U.S. Cl. .............................. 707/10; 379/37; 379/38; 379/40; 379/45; 340/825.37; 340/825.54
[58] Field of Search .................. 379/37, 38, 40, 379/45; 455/404, 412, 413, 435; 340/825.54, 825.37; 707/10

[56] References Cited

U.S. PATENT DOCUMENTS

| | | | |
|---|---|---|---|
| 4,524,354 | 6/1985 | Morgan | 340/825.36 |
| 4,749,987 | 6/1988 | Ishii | 340/587 |
| 4,803,039 | 2/1989 | Impink et al. | 376/216 |
| 5,195,126 | 3/1993 | Carrier et al. | 379/45 |
| 5,355,395 | 10/1994 | Kenneth et al. | 376/216 |
| 5,379,337 | 1/1995 | Castillo et al. | 379/45 |
| 5,444,760 | 8/1995 | Russ | 379/45 |
| 5,629,687 | 5/1997 | Sutton | 340/825.37 |

OTHER PUBLICATIONS

System helps emergency teams make life-saving decisions: EPA's Cameo, Government Computer News, v12,n10 p. 60 1–4, May 10, 1993.
Technology goes to the fault–line: FEMA, Government Computer News, v12,n16, p. 45 (1–3), Aug. 2, 1993.
Digital Communications ready to answer call for customer service, Computing Canada, v19,n19,ps34(1–2), Sept. 3, 1993.
Lifeline Systems' brochure for Lifeline (reg) system, reference number FA1330, 2 pages, no date.
Advertisement in Northwestern Airlines in Flight Magazine World Traveler, Oct. 1996.
Comtradindustries, SOS Phone, 1 page, no date.

*Primary Examiner*—Thomas G. Black
*Assistant Examiner*—Diane D. Mizrahi
*Attorney, Agent, or Firm*—Ray K. Shahani, Esq.

[57] ABSTRACT

A potential hazard and risk-assessment data communication network for collecting, maintaining and utilizing such data efficiently, particularly for providing such data to emergency service providers via emergency service provider dispatcher, the network and data typically maintained by a custodian, the data communication network comprising, in combination a pre-existing database and a pre-existing information communication system, a potential user report means, the report means sufficient to efficiently report any and all potential hazard and risk-assessment data to the custodian of the network, an enhanced database, the enhanced database having a predetermined structure, the enhanced database comprising all potential hazard and risk-assessment data of potential utility to an emergency service provider, and an emergency service provider dispatch means, the dispatch means having a direct link to the enhanced database and a direct link to a emergency service provider, wherein upon placing a distress call via the pre-existing information communication system the dispatcher of the emergency service providers is directly linked to the enhanced database and the dispatcher is immediately supplied with all potential hazard and risk-assessment data of potentially immeasurable utility for enjoining the emergency situation.

10 Claims, 5 Drawing Sheets

THIS IS THE AREA OF A CUSTOMERS BILL FOR NEW SERVICES.

Local Toll Calls

| Date | Time | Place and Number Called | Type | Rate | Mins | Amount |
|---|---|---|---|---|---|---|
| Mar 2 | 6:29P | Pleasanton CA | Direct | Night | 3 | .22 |
| Mar 2 | 6:36P | Santa Cruz CA | Direct | Night | 2 | .16 |

Total Discounted Calls

New Service Offers

A new service to help our customers be prepared for Emergences. 911-Info, a Hazard and Risk Assessment Data Communication Network. The service is designed to help assist all customers during an Emergency. This service alerts the Emergency Rescue Services of special needs that you or your family may have. Customers who may be handicapped, (Blind residents, wheelchair, oxygen) or have special needs will have the chance to have this information available to the Emergency Rescue Team. Prior knowledge of this crucial information could provide you and your family with the most vital assistance needed in an Emergency. This information will be associated with your corrsponding loction. The exact address will be where your number is registered. This is a continued effort to help the community and the Emergency Services Department. This service could save your life.

FIG. 2

PHONE /
NETWORK CO.

POTENTIAL HAZARD RISK ASSESSMENT DATA FORM

This form will be used to assist individuals, families, handicapped persons, and included pets, with medical and occupant special needs. Applying to the subscribed Network number at the exact address location. Please take a moment to read, and complete the following information. This form is used to relay the occupant and medical needs of the corresponding address to the responding Emergency and Rescue Service. This information is crucial in regards to exact information content being supplied. Medical information may be required to be signed by your doctor.

This is a *New Service* Developed by Dfx. Pro. Inc. The enhanced system will provide Real Time Communications, Advanced Emergency Rescue and Response, Local Disaster Effects Protocol, and Action Plans to assist you, your family, and local communitys in Emergences. This System is also set to improve, and Expand the existing Emergency 911 Service. This will not change the 911 service you already have, as required by the Public Utilities Commission.

We hope you will consider whether you and or your family can benefit by having your special needs known ahead in the event an emergency arises. This could save your life.

Phone Number(s)_____    Address exact location_____

_____

_____

Signature:_____    Date:_____

FIG. 3A

Customer Name:_____ Date of Birth:_____ M/F____

Home Address:_____City:_____

State:_____ Zip:_____ Exact location in critical.

Phone:_____ Bus:_____Other:_____

Contacts:_____

Emergengy Phone:_____ _____

House structure: (Apt, Moblie Home, Floor, Rooms)_____
_____

Emergency Needs: (Blind, Wheelchair, Confined to Bed, Other)_____
_____
_____

Medications: (Alegeric, Manditory, Oxygen)_____
_____

Prior Conditions: (Heart Murmur / Attack, Epilepsy, Diabetes, Pace Maker, Stroke,)
_____
_____

Physician's Name: _____ Address:_____

Phone: _____ Emergency Contact:_____

Physician's Signature:_____

Pets: _____ Other Infomation:_____

Signature of Customer:_____

FIG. 3B

ENHANCED DATA BASE

PRIORTY _____

NAME _____

ADDRESS _____
_____

PHONE _____

BUS / RES _____ COIN _____

FIRE JURISDICTION _____

POLICE JURISDICTION _____

AMBULIENCE _____

******* CUSTOMER SUPPLIED ***********

HANDICAP _____   OCCUPANTS _____

MEDICATIONS _____

PRIOR MEDICAL _____   M/F _____

HOUSING STRUCTURE _____

PHYSICIAN'S SIGNATURE _____

FIG. 4

POTENTIAL HAZARD AND RISK-ASSESSMENT DATA COMMUNICATION NETWORK

FIELD OF THE INVENTION

The present invention relates to emergency information communication systems and services and in particular to a new and advanced electronic data transfer system whereby critical information necessary or useful to emergency service providers in cases of medical emergency, environmental and other physical disasters.

BACKGROUND OF THE INVENTION

The well-known telephone number "911" is used throughout the United States and many foreign countries as a telephone number which may be dialed by any private telephone for direct communication to emergency service provider dispatchers. A large number of service dispatch centers are located throughout the country, typically each individual city or locale serviced by a single center or joint center. For example, a single large city may have one or more service dispatch centers located at various positions throughout the city. Every residential or business telephone line linked to the local telephone system (as opposed to strictly internal-types of telephones) would be connected to the nearest dispatch center or to the dispatch center dispatching emergency services to the address of origin of the emergency call.

Unfortunately, the "911" system is inherently limited in it's usefulness and, ultimately, it's utility. Typically, if a call to a "911" service center is made, the service center automatically obtains information about the caller based strictly on the information put into the telephone system's computer system. Once communication is established, the individual telephone relays between the origin of the call and the dispatch center cannot be traced conveniently. Therefore, the only information which the emergency dispatch providers have before them would be the address of the originating telephone call. Furthermore, often the address which is presumably associated with the actual origin of an emergency call is actually the billing address, the owner's address, etc. The consequences of transmitting emergency service personnel to the wrong address in the case of an emergency could lead to further catastrophe.

Furthermore, in a very large number of emergency calls to such emergency dispatch centers, very little information is actually transmitted to the operator or other emergency dispatch personnel at the receiving end of the "911" call. Often a telephone call is made but before the operator can answer the telephone call personally the call is put on "hold" or asked to record a brief message. Ultimately, personal contact may be impossible given the volume or such emergency calls incoming or the small number of emergency dispatch centers. Therefore the precise nature of the emergency may be impossible to determine until a first emergency unit arrives at the actual scene of the emergency. Typically, residential or suburban emergencies include minor to major medical emergencies, fires, floods, electrical, gas or other utility problems. Furthermore, urban centers include large structures for manufacturing, waterfronts and shipping vessels and commercial buildings and rural settings include forests. Each of these unique settings may require it's own set of emergency-preparedness parameters, including methods and personnel for handling industrial accidents, chemical spills, exposure to certain types of substances, earthquake damage to tall buildings, etc.

A need exists in the prior art to provide an improved critical information communication system to avoid the shortcomings of the prior art, i.e., a failsafe system for supplying critical information or any and all unique, characteristic, historical or potential hazard and risk-assessment data to emergency service dispatch personnel in a timely, manner.

Thus, broadly, it is an object of the present invention to provide an improved potential hazard and risk-assessment data communication network which is a failsafe system for supplying critical information or any and all unique, characteristic, historical or potential hazard and risk-assessment data to emergency service dispatch personnel in a timely, manner.

It is a further object of the present invention to provide such a system which links the end user of the emergency service directly with the service provider dispatcher so as to have access to the most current, accurate, complete potential hazard and risk-assessment data.

It is a further object of the present invention to provide such a system utilizing an existing infrastructure, including existing telephone, electronic linkage, cable, radio or other frequency wave, personnel-based as well as automated emergency provider and dispatcher.

It is a further object of the present invention to provide such a system to a greatly enhanced number of beneficiaries in a greatly enhanced location and scope of emergency-preparedness than provided for currently or known heretofore.

SUMMARY OF THE INVENTION

A potential hazard and risk-assessment data communication network for collecting, maintaining and utilizing such data efficiently, particularly for providing such data to emergency service providers via emergency service provider dispatcher, the network and data typically maintained by a custodian, the data communication network comprising, in combination a pre-existing database and a pre-existing information communication system, a potential user report means, the report means sufficient to efficiently report any and all potential hazard and risk-assessment data to the custodian of the network, an enhanced database, the enhanced database having a predetermined structure, the enhanced database comprising all potential hazard and risk-assessment data of potential utility to an emergency service provider, and an emergency service provider dispatch means, the dispatch means having a direct link to the enhanced database and a direct link to a emergency service provider, wherein upon placing a distress call via the pre-existing information communication system the dispatcher of the emergency service providers is directly linked to the enhanced database and the dispatcher is immediately supplied with all potential hazard and risk-assessment data of potentially immeasurable utility for enjoining the emergency situation. A preferred embodiment of the present invention comprises a potential user notification means for advising all potential users of the existence and importance of such network and for providing additional information of utility, the additional information of utility including identifying indicia, physical, facsimile, electronic or other address of the custodian of the network. A preferred embodiment of the present invention comprises a data input means, the input means for uploading user data from the report means such that the enhanced database comprises information which is always current, accurate and complete. In a preferred embodiment of the present invention the pre-existing communication system is selected from one of the following pre-existing communication systems: local-area computer network, wide-area computer network, telephone, television, internet, electronic mail, cable, facsimile, radio-frequency and other frequency transmission. In a preferred embodiment of the present invention the dispatch means comprises an emergency service provider dispatcher graphical user interface, the graphical user interface serving to communicate potential hazard and risk-assessment data from the enhanced database to the dispatcher efficiently and according to the predetermined structure of the enhanced database. In a preferred embodiment of the present invention the predetermined structure of the enhanced database is field based.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 2 is a representative user notification means.

FIG. 3A and 3B are a representative user data report means.

FIG. 4 is a representative emergency service provider dispatcher graphical user interface.

DETAILED DESCRIPTION OF THE PREFERRED EMBODIMENT

Figure 1:
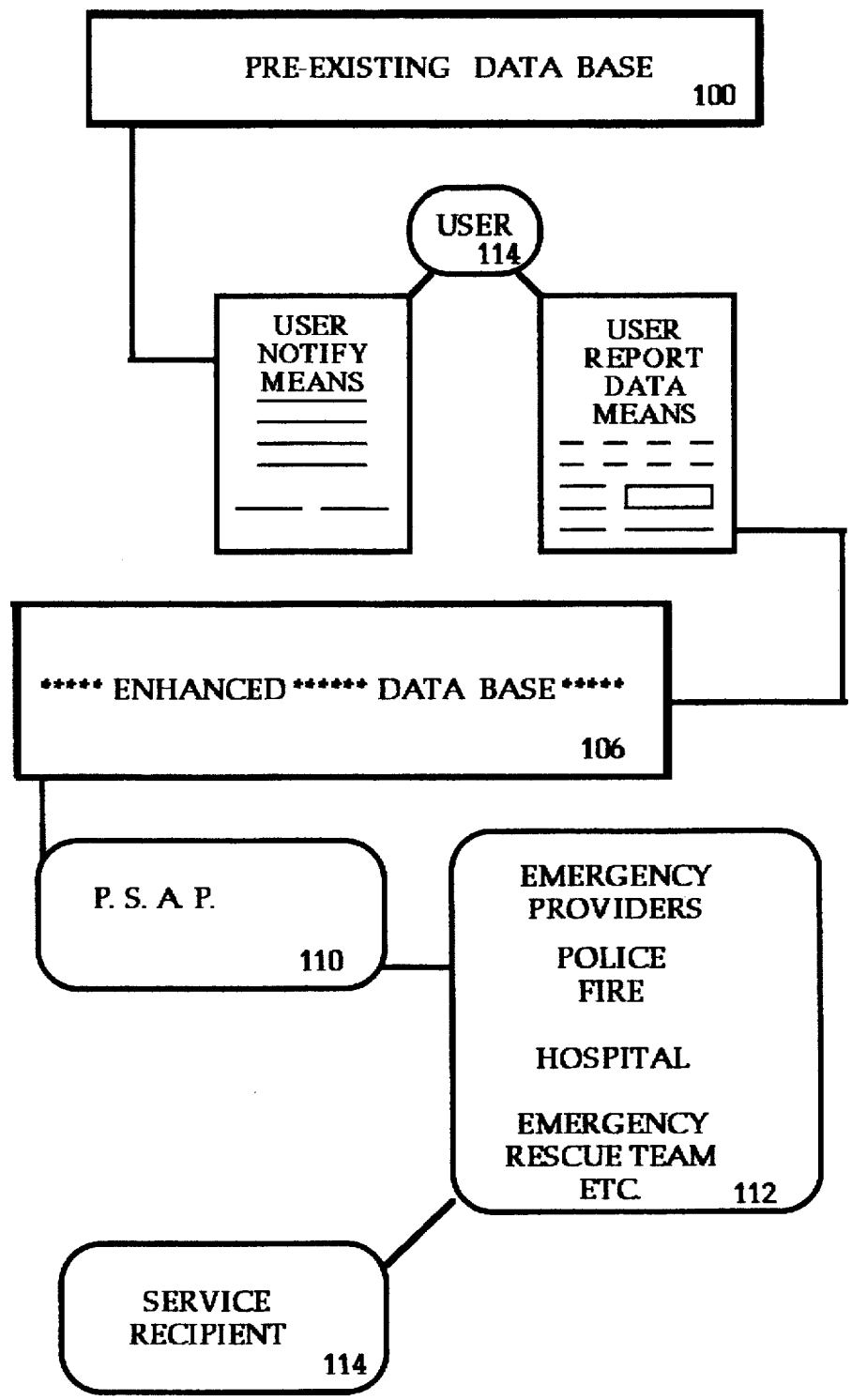
FIG. 1 is a block diagram of a preferred embodiment of the potential hazard and risk-assessment data communication network and method of use.

FIG. 1 is a block diagram of a preferred embodiment of the potential hazard and risk-assessment data communication network and method of use. As in the prior art, a pre-existing database 100 of certain limited information is currently maintained by a custodian, typically a public utility. This database may or may not be accurate with regard to the information it contains. Furthermore, if it is accurate, it may not provide the necessary information to emergency service providers, such as address of caller, medical history, access to location, directions, etc. The pre-existing database typically is maintained by a public utility, although a number of factors, including deregulation, privatization and natural evolution, are known to change this. In reality, it is not uncommon for private non-profit or for-profit organizations to maintain and operate such databases, including emergency service provider dispatch means. The custodian, therefore, may be the local or national telephone company, a local or national internet service provider, a local or national cable company, or a local or national emergency service provider. In any event, in a preferred embodiment of the present invention the custodian of this information will have the capability to transmit to each user of the telephone or other communication system a user notification means 102.

FIG. 2 is a representative user notification means 102. The purpose of the user notification means is to make each and every user of the potential hazard and risk-assessment data communication network personally aware of the existence of and their need to use the novel system. By informing an entire predetermined population, it is possible to create a truly comprehensive, accurate, current database serving 100% of a community's emergency preparedness needs. The user notification means can be, simply, a printed communication made part of a billing statement, or a separate mailed or otherwise delivered printed notification. It can also take the form of an electronic message or e-mail, it could be transmitted via audible and visual media over telephone lines, television broadcast, radio or other frequency transmission, hardcabled or wireless networks or other communication systems.

FIG. 3 is a representative user data report means. The user is also provided with, in addition to the notification means, a user data report means 104. This means serves to interface between the user and the custodian of the information. The report means, like the notification means, can be a printed document, an electronic document or an interactive on-line or downloadable menu driven data entry system. The data which the user must provide to the custodian via this report means will include precise physical address of the origin of the call, i.e. the site of the emergency, the identity of a potential user or caller and the potential user's recent and distant medical history. The data also contains a list of potential accidents based on the characteristic profile of the potential caller/user. This list of potential hazards or risks might include, for a typical residence, any risks statistically encountered by the elderly, small infants or young children depending on the actual inhabitants of the residence. Additionally, for a typical residential user, the presence of any uncommon materials being stored in any particular location in the residence, the number and nature of any pets, the nature and location of extremely valuable items of information such as jewelry, artwork, stored data, etc. For industrial or commercial locations, potential users will include employees, building managers and engineers. Unique potential hazards and risks include presence of flammable or explosive materials, toxic or otherwise dangerous materials, locations where access or escape is difficult or impossible, irregular, unobvious or otherwise typically or potentially impaired. Other information which is critical in certain situations include number, identity and population density of inhabitants in preselected locations, optionally on a temporal basis.

The report means in transmitted to the custodian who then creates an enhanced database 106. The custodian in certain situations will have personnel manually enter data into the database read directly from printed report documents returned from the potential users or their agents. The data could also be put into the enhanced database electronically via file transfer, on-line data entry, or other data input means. It will be understood that the potential users will have the ability to transmit this data to the custodian whenever new information is deemed necessary, for example after a change in a potential call/user's medical status. Users of the network will be able to access the data report means conveniently, either by having printed documents delivered to them personally, by having a telephonic, electronic or facsimile address for transmitting such information, or being able to interact with a remote custodian via cable or wireless network. This will insure the completeness, accuracy and relevance of any and all potential hazard and risk-assessment data comprising the enhanced database.

The structure of the enhanced database is very important. Specific fields with precise identifiers are used and the data is stored in storage means. This field-specific structure is critical to the most complete function of the present invention. All of the data comprising the enhanced database is uniquely addressed in the storage means. For example, user data will be stored in individual fields corresponding to potential user physical address, nature of user (e.g. residential, industrial, commercial), and the like. For each individual potential caller or user individual corresponding fields include gender, age, height and weight, specific allergies or intolerances to natural substances, foreign or synthetic materials, or specific medical formulations or treatments. Specific fields contain information regarding physical challenges or handicaps and are, preferably, indexed according to cardiological, neurological, vascular, internal, urological, reproductive, ENT, immunological and other characteristic conditions. This unique field-oriented structure allows immediate access to specific information, avoiding time-consuming and inaccurate unstructured sorting of large volumes of useless or irrelevant information in a particular emergency situation.

FIG. 4 is a representative emergency service provider dispatcher graphical user interface 108. Once the enhanced database is installed the data contained therein will be made available to the emergency service provider dispatcher 110. The dispatcher will receive a distress call via telephone, modem, facsimile, electronic mail or pager or other communication means. When the distress call is answered, the dispatcher is automatically linked to the potential hazard and risk-assessment data communication network. Once the link is established between the actual caller/user and the emergency service provider dispatcher, all of the data will be available to the dispatcher. The graphical user interface is representative of a "screen" or image of data contained therein. It will be apparent to those skilled in the art that it may be impossible to install the data and the graphical user interface in such a manner as to provide complete visual access to the entire data record. In such instance, the critical data contained in the potential user's record may be viewed in successive screens or the record may be "scrolled" through with the familiar scroll-type function permitted by most of today's data storage, accessing and manipulation applications and supported by current hardware including monitors and keyboards. It will also be apparent to those skilled in the art that the format of the graphical user interface may be varied to accommodate the characteristic potential hazard and risks associated with a given potential user as well as to accommodate the fields useful or necessary for a given emergency service provider dispatcher. For example, while caller identification and caller physical address may be universally useful, it will be apparent that certain industrial users may require more than an initial screen of data to accommodate the potential hazard and risk data relevant to the business. More detailed information may require a plurality of data screens or a record significantly larger than that reproducible on a given screen. Moreover, the dispatcher will have the ability to address specific fields within the enhanced database of critical data. Thus, for example, if the dispatcher is aware that a fire has broken out at a certain location, the dispatcher will be able to immediately inquire as to the presence of explosive, flammable materials or areas where critically important data or other materials or objects are stored. In this manner, the dispatcher can convey this information directly to the service provider so as to alert the service provider of potential causes of loss.

In any event, once the emergency service provider dispatcher receives a distress call, the appropriate emergency service provider 112 can be notified expediently and directly. Notification of the emergency service provider may occur via telephone, computer link, facsimile or other electronic mail system. The dispatcher will be able to download the relevant critical potential hazard or risk-assessment data directly to the service provider by selecting one or more fields of data which are deemed relevant to the specific emergency situation encountered. For example, as before, if a fire is reported in a certain structure, the dispatcher will be able to dispatch a fire unit to the site. Additionally, if the site of the fire is reported from a structure in which a large number of individuals typically reside or are employed, emergency medical teams may be alerted. In the event the distress call is received from an airport, for example, the appropriate emergency service provider could be notified along with appropriate regulatory or emergency personnel at neighboring airfields so as to alert or divert incoming aircraft. This enhanced emergency notification network will be especially useful to providers of public transportation and facilities which cater to the needs of large numbers of people.

It will be apparent that the dispatcher will be equipped with a large amount of hazard and risk data. In this way, police, fire, medical, hospital, industrial and environmental disaster specialists will be effectively linked to the dispatcher. Any conceivable emergency which may arise can be effectively enjoined. Once the nature of the emergency is known or before, the dispatcher will route the appropriate emergency service provider directly to the potential user 114 so as to confront and enjoin the emergency situation.

In sum, the preferred embodiment of the present invention includes an existing database, potential user notification and report means, an enhanced database comprising the latest, most up to date and accurate relevant information, access to the enhanced database by "911" emergency service provider dispatcher personnel or communication equipment, direct communication links to the plurality of emergency service providers and downloading capabilities for providing the emergency service providers with the precise, critical, relevant emergency data called for in the particular, unique emergency situation encountered.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true spirit and scope of the invention.

I claim:

1. A potential hazard and risk-assessment data communication network for collecting, maintaining and utilizing such data efficiently, particularly for providing such data to emergency service providers via emergency service provider dispatcher, the network and data typically maintained by a custodian, the data communication network comprising, in combination:

a pre-existing database and a pre-existing information communication system;

a potential user report means, the report means sufficient to efficiently report any and all potential hazard and risk-assessment data to the custodian of the network;

an enhanced database, the enhanced database having a predetermined structure, the enhanced database comprising all potential hazard and risk-assessment data of potential utility to an emergency service provider;

an emergency service provider dispatch means, the dispatch means having a direct link to the enhanced database and a direct link to a emergency service provider, wherein upon placing a distress call via the pre-existing information communication system the dispatcher of the emergency service providers is directly linked to the enhanced database and the dispatcher is immediately supplied with all potential hazard and risk-assessment data of potentially immeasurable utility for enjoining the emergency situation and a potential user notification means for advising all potential users of the existence and importance of such network and for providing additional information of utility, the additional information of utility including identifying indicia, physical, facsimile, electronic or other address of the custodian of the network.

2. The network of claim 1 further comprising a data input means, the input means for uploading user data from the report means such that the enhanced database comprises information which is always current, accurate and complete.

3. The network of claim 1 wherein the pre-existing communication system is selected from one of the following pre-existing communication systems: local-area computer network, wide-area computer network, telephone, television, internet, electronic mail, cable, facsimile, radio-frequency and other frequency transmission.

4. The network of claim 1 wherein the dispatch means comprises an emergency service provider dispatcher graphical user interface, the graphical user interface serving to communicate potential hazard and risk-assessment data from the enhanced database to the dispatcher efficiently and according to the predetermined structure of the enhanced database.

5. The network of claim 1 wherein the predetermined structure of the enhanced database is field based.

6. A potential hazard and risk-assessment data communication network for collecting, maintaining and utilizing such data efficiently, particularly for providing such data to emergency service providers via emergency service provider dispatcher, the network and data typically maintained by a custodian, the data communication network comprising, in combination:

a pre-existing database and a pre-existing information communication system;

a potential user report means, the report means sufficient to efficiently report any and all potential hazard and risk-assessment data to the custodian of the network;

an enhanced database, the enhanced database having a predetermined structure, the enhanced database comprising all potential hazard and risk-assessment data of potential utility to an emergency service provider; and an emergency service provider dispatch means, the dispatch means having a direct link to the enhanced database and a direct link to a emergency service provider, the dispatch means comprising an emergency service provider dispatcher graphical user interface, the graphical user interface serving to communicate potential hazard and risk-assessment data from the enhanced database to the dispatcher efficiently and according to the predetermined structure of the enhanced database, wherein upon placing a distress call via the pre-existing information communication system the dispatcher of the emergency service providers is directly linked to the enhanced database and the dispatcher is immediately supplied with all potential hazard and risk-assessment data of potentially immeasurable utility for enjoining the emergency situation.

7. The network of claim 6 further comprising a potential user notification means for advising all potential users of the existence and importance of such network and for providing additional information of utility, the additional information of utility including identifying indicia, physical, facsimile, electronic or other address of the custodian of the network.

8. The network of claim 6 further comprising a data input means, the input means for uploading user data from the report means such that the enhanced database comprises information which is always current, accurate and complete.

9. The network of claim 6 wherein the pre-existing communication system is selected from one of the following pre-existing communication systems: local-area computer network, wide-area computer network, telephone, television, internet, electronic mail, cable, facsimile, radio-frequency and other frequency transmission.

10. The network of claim 6 wherein the predetermined structure of the enhanced database is field based.

* * * * *